United States Patent [19]

Harasaki et al.

[11] Patent Number: 5,024,482

[45] Date of Patent: Jun. 18, 1991

[54] FRONT BODY STRUCTURE OF AUTOMOTIVE VEHICLE

[75] Inventors: Hayatsugu Harasaki, Hiroshima; Reiji Kikuchi, Yokohama, both of Japan

[73] Assignee: Mazda Motor Corporation, Hiroshima, Japan

[21] Appl. No.: 531,405

[22] Filed: Jun. 4, 1990

[30] Foreign Application Priority Data

Jun. 2, 1989 [JP] Japan ............................. 1-64815

[51] Int. Cl.⁵ ............................................. B62D 27/00
[52] U.S. Cl. ..................................... 296/194; 296/198; 280/688
[58] Field of Search ................. 296/194, 198, 188; 280/688

[56] References Cited

U.S. PATENT DOCUMENTS

| | | | |
|---|---|---|---|
| 4,408,794 | 10/1983 | Harasaki | 296/198 |
| 4,717,198 | 1/1988 | Komatsu | 296/194 |
| 4,919,474 | 4/1990 | Adachi et al. | 296/194 |
| 4,955,663 | 9/1990 | Imura | 296/194 |

Primary Examiner—Robert R. Song
Attorney, Agent, or Firm—Fleit, Jacobson, Cohn, Price, Holman & Stern

[57] ABSTRACT

A front body structure of a vehicle includes a side frame and a front wheel apron reinforcement, both extending in a lengthwise direction from front to rear of the vehicle. A suspension tower is secured between the side frame and front wheel apron reinforcement for supporting a suspension. A front wheel housing is also secured between the side frame and front wheel apron reinforcement for receiving therein a front wheel. Front and rear side wheel aprons extend in the lengthwise direction, constitute the front wheel housing, and are located on front and rear sides of the suspension tower, respectively. A junction member is provided between and secured to the suspension tower and each wheel apron to form a hollow frame section adjacent to the suspension tower. Bracket holders for holding brackets to support a front suspension arm and connect them to the front body structure are provided and are divided into two parts. Each part is integrally formed with one of the wheel aprons or one of the junction members.

4 Claims, 3 Drawing Sheets

FRONT BODY STRUCTURE OF AUTOMOTIVE VEHICLE

FIELD OF THE INVENTION

The present invention relates to part of the body structure of a vehicle and, more particularly, to the front body structure surrounding front suspension towers of a car body.

BACKGROUND OF THE INVENTION

Since suspension towers of a car body are typically subjected to a great deal of vertical force transmitted from wheels through suspensions, it is desirable to provide the suspension tower with as high a structural rigidity as possible. To provide a suspension tower with high structural rigidity, reinforcement members may be attached on front and rear sides of the suspension tower. Such a front body structure is known from, for example, Japanese Utility Model Application No. 62-65464, entitled "Front Body Structure 0f A Vehicle," filed on April 1987 and laid open to the public as Japanese Unexamined Utility Model Publication No. 63-171286 on Nov. 8, 1988.

Typically, a suspension arm of a multiple link type of suspension has the connecting points by which it is connected to a car body located on front and rear sides of a suspension tower. Because of structural characteristics of the suspension tower, brackets are attached to front and rear sides of the suspension tower to connect the suspension arm to the car body. Also, since the suspension arm is usually subjected to a great deal of force at its connecting points, such brackets must have a high connective rigidity, i.e., be rigidly connected to the car body.

To improve the connective rigidity of the bracket for connecting the suspension arm to the car body, provide the suspension arm with a sufficient structural strength and improve the strength of the suspension tower itself, it is common to use reinforcements for reinforcing those parts of the suspension arm to which the bracket is connected, in addition to the use of reinforcements for the suspension tower. However, providing separate reinforcements for the suspension tower and suspension arm is costly, increases the weight of car body and necessitates the use of many parts or elements.

SUMMARY OF THE INVENTION

It is accordingly a primary object of the present invention to provide a front body structure of a vehicle which can improve the rigidity not only of a suspension tower but also of suspension arm supporting structure without increasing the cost or weight of the vehicle body.

The object of the present invention is achieved by providing a front body structure of a vehicle including a side frame and a front wheel apron reinforcement, both extending in a lengthwise direction from front to rear of the vehicle. A suspension tower is secured between the side frame and front wheel apron reinforcement for supporting a suspension, and a front wheel housing is secured between the side frame and front wheel apron reinforcement for receiving therein a front wheel. Front and rear side wheel apron members extend in the lengthwise direction, and constitute the front wheel housing. These apron members are located on front and rear sides of the suspension tower, respectively. A junction member is located between and secured to the suspension tower and each of the front and rear wheel apron members to form a hollow frame section adjacent to the suspension tower. The front body structure has holding means which is divided into two parts integrally formed with the wheel apron member and the junction member, respectively, for holding a bracket supporting a front suspension arm and connecting it to the front body structure.

Because the hollow frames are not only located on and secured to the front and rear ends of the suspension tower but also are constituted by the front and rear junction members and the front and rear wheel aprons members, the supporting structure of suspension tower has a highly improved structural rigidity. Furthermore, because the bracket for the suspension arm is grasped between and by the junction member and wheel apron which constitute the hollow frames, an improved suspension arm holding structure is realized.

BRIEF DESCRIPTION OF THE DRAWINGS

The above and other objects and features of the present invention will be apparent from the following description of a preferred embodiment thereof when considered in conjunction with the appended drawings, in which.

DETAILED DESCRIPTION OF THE PREFERRED EMBODIMENT

Because the general front body structure of a car body is well known to those skilled in the art, the following description will be directed, in particular, to elements forming part of, or cooperating with, the novel structure in accordance with the present invention. It is to be understood that elements not specifically shown or described can take various forms well known to those skilled in the vehicle art.

Figure 1:
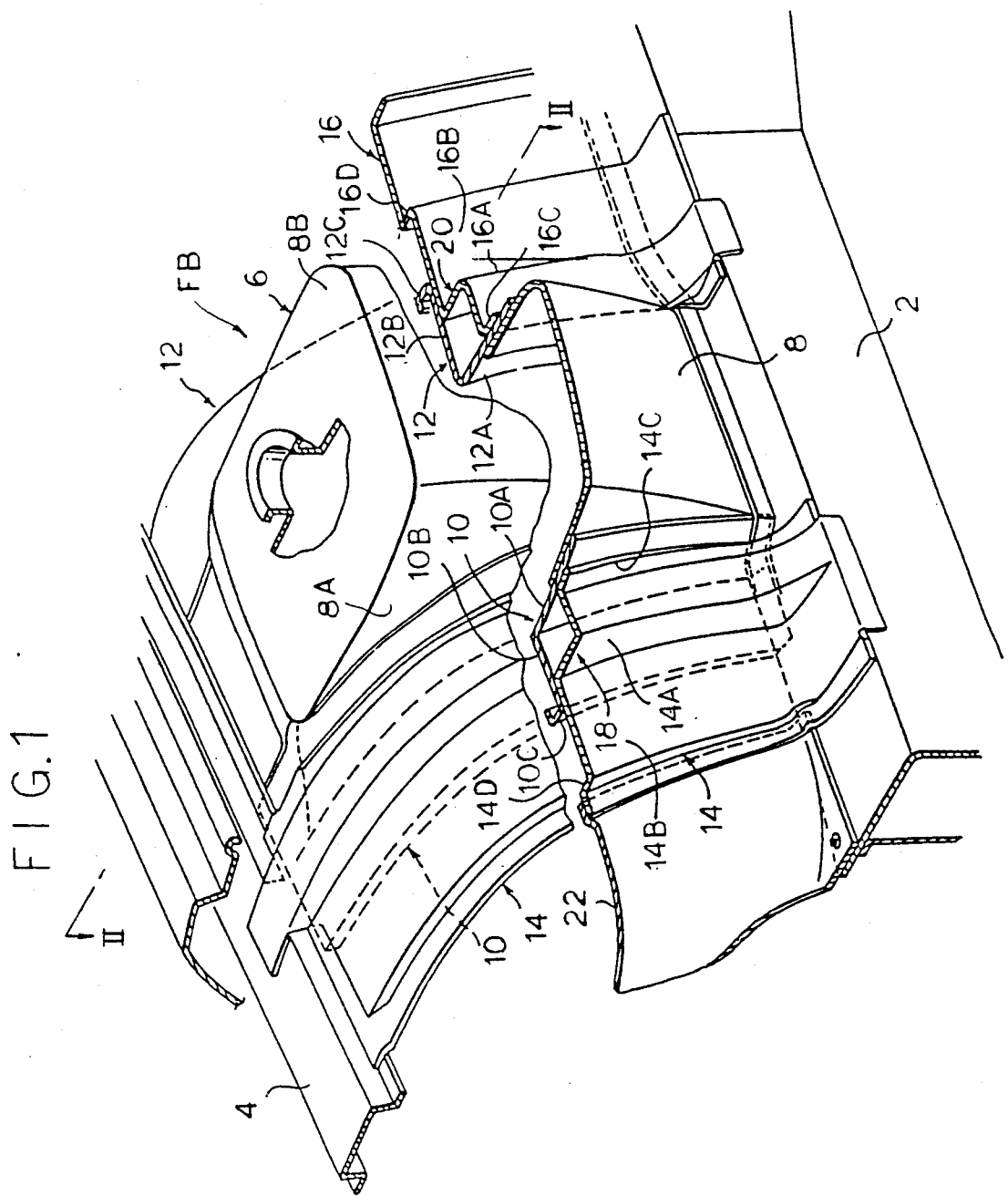
FIG. 1 is a perspective view, partly cut away, showing a right side half of a vehicle front body structure in accordance with a preferred embodiment of the present invention.
Figure 2:
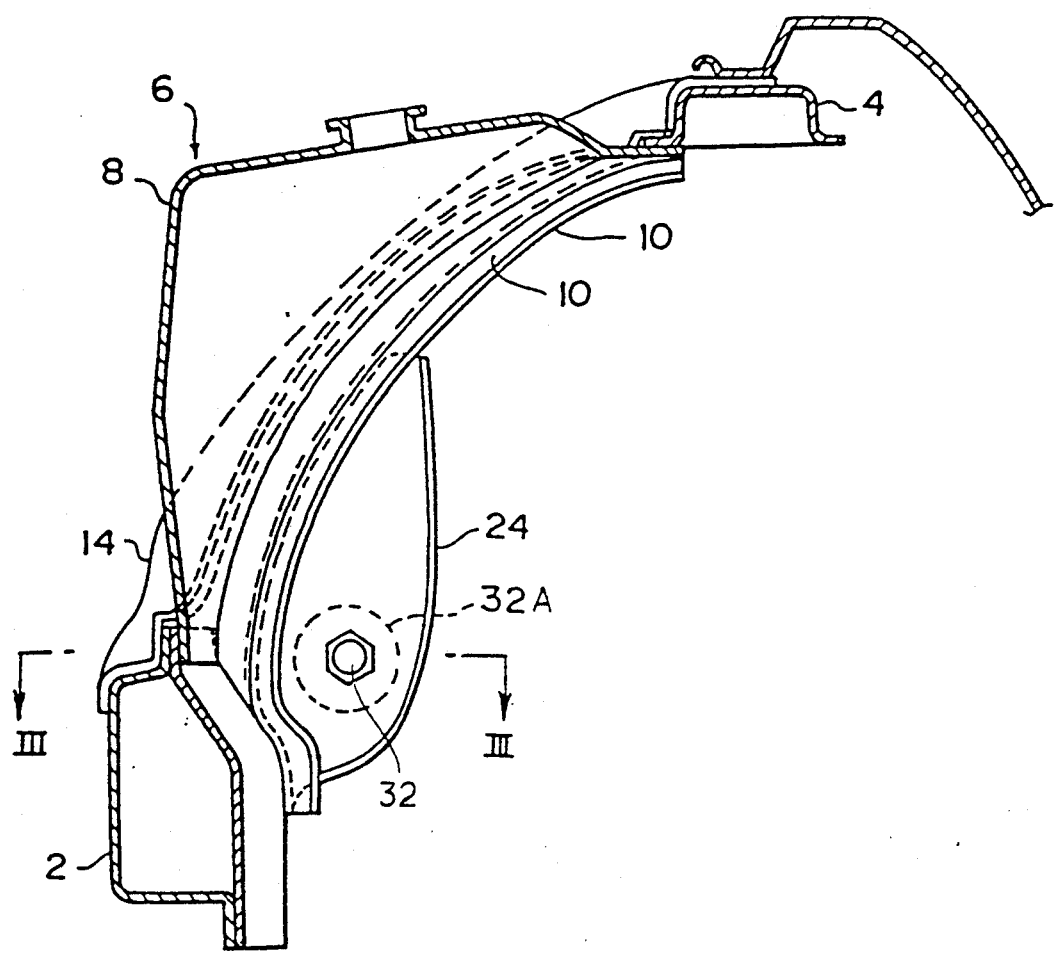
FIG. 2 is a cross-sectional view of FIG. 1 as seen along section line II—II.
Figure 3:
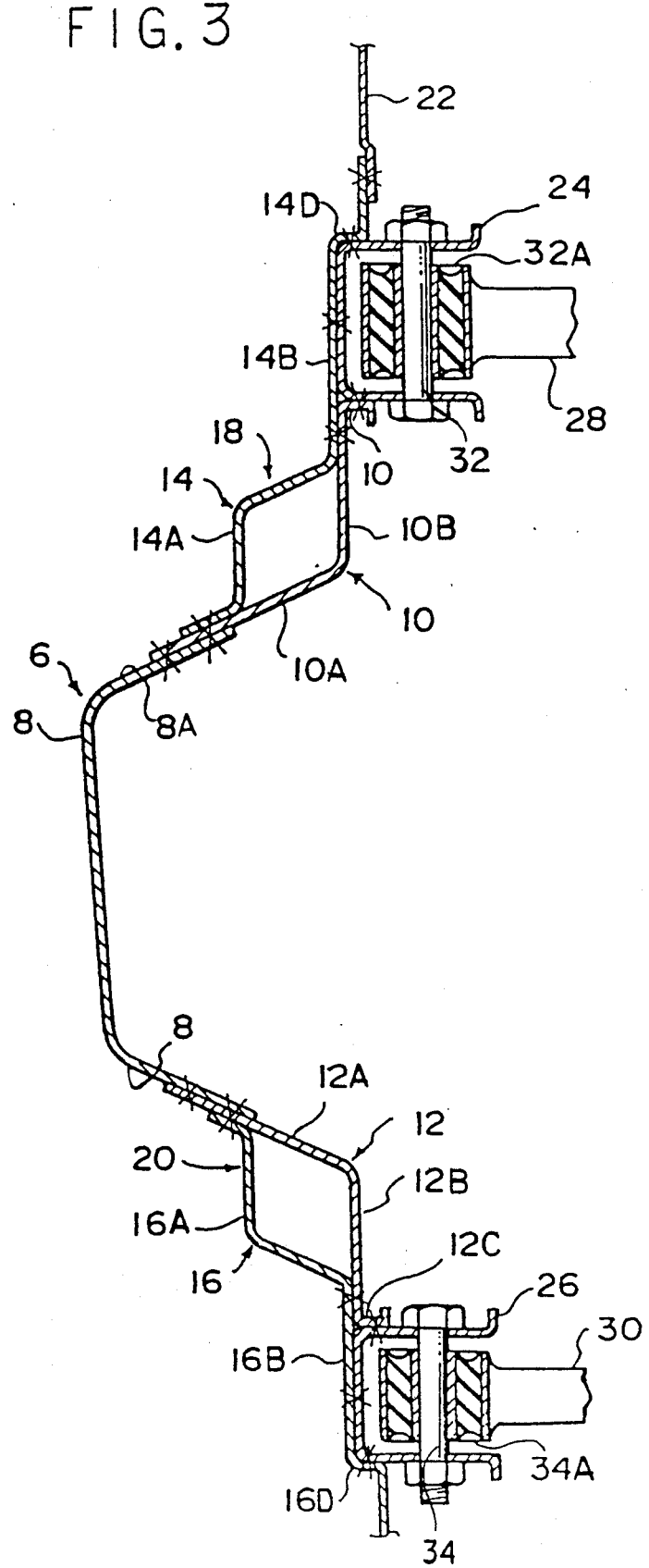
FIG. 3 is a cross-sectional view of FIG. 2 as seen along section line III—III.

Referring to FIGS. 1-3, details of a right side portion of a front body section, generally designated by reference character FB, is illustrated in a partially broken away, perspective view. The front body section FB includes a side frame 2 extending in a lengthwise direction of the car body. The front body section also includes a front wheel apron reinforcement 4 extending in the lengthwise direction and displaced laterally of and upwardly from the side frame 2. A tower panel 8 of a front suspension tower 6 is disposed between the side frame 2 and reinforcement 4, with its upper and lower parts welded or otherwise secured to the reinforcement 4 and side frame 2, respectively.

Two cross-sectionally box-shaped hollow channel frames, i.e., a front channel frame 18 and a rear channel frame 20, are provided in the front body section. Each of the box-shaped channel frames 18 and 20 has a substantially rectangular or other quadrilateral cross-section and is disposed on opposite sides, namely on front and rear sides, of the suspension tower 6, as viewed in the lengthwise direction of the vehicle. These channel frames 18 and 20 are formed by front and rear junction members 10 and 12 and front and rear wheel aprons 14 and 16, respectively. Front and rear wheel aprons 14 and 16 together form a front wheel housing.

As is clearly illustrated in FIGS. 1 and 3, each of the junction members 10 and 12 has a generally L-shaped cross-section and is constituted by first and second end wall sections 10A and 12A, respectively, extending in a direction of the car body width, and first and second side wall sections 10B and 12B, respectively. Side wall sections 10B and 12B are either perpendicular or disposed at an obtuse angle relative to the end wall sections 10A and 12A, respectively. The first end and side wall sections 10A and 10B combine to form a first generally L-shaped channel frame portion. Similarly, the second end and side wall sections 12A and 12B combine to form a second generally L-shaped channel frame portion. Each junction member 10, 12 is secured to the front body section FB by having a portion of the wall surface of the end wall sections 10A, 12A welded to end walls 8A, 8B of the suspension tower 6. Upper and lower ends 10U, 12U and 10L, 12L respectively, of the junction members 10 and 12 are welded or otherwise secured to the reinforcement 4 and the side frame 2, respectively.

The front wheel apron 14 and the rear wheel apron 16 are, respectively, formed with apron panel sections 14B and 16B, each extending in the lengthwise direction of the vehicle, and generally L-shaped channel sections 14A and 16A integrally formed with and at rear and front ends of the apron panel sections 14B and 16B, respectively. Flanges 14C and 16C are provided at rear and front ends of L-shaped channel sections 14A and 16A, respectively. Flange 14C is integral with the L-shaped channel section 14A, while flange 16C is integral with the L-shaped channel section 16A. Portions of the wall surfaces of the apron panel sections 14B and 16B of the junction members 10 and 12 are welded or otherwise secured to the side wall sections 10B and 12B. Similarly, flanges 14C and 16C are welded or otherwise secured to portions of the wall surfaces of the end wall sections 10A and 12A of the junction members 10 and 12, respectively. End wall section 10A, side wall section 10B, apron panel section 14B, L-shaped channel section 14A and flange 14C thereby form the front cross-sectionally box-shaped channel frame 18. Similarly, end wall section 12A, side wall section 12B, apron panel section 16B, L-shaped channel section 16A and flange 16C form the rear cross-sectionally box-shaped channel frame 20. Channel frames 18 and 20 extend between the side frame 2 and reinforcement 4 on front and rear sides of the suspension tower 6. An entire forward wheel enclosure, located in front of the suspension tower 6, is actually formed by the front wheel apron 14, forming a rear part of the entire forward wheel enclosure, and an additional wheel apron 22 connected or welded to the front wheel apron 14.

The junction members 10, 12 and wheel aprons 14, 16 hold therebetween a bracket for attaching a suspension. As is shown in detail in FIGS. 2 and 3, each junction member 10, 12 is integrally formed with a first mounting flange 10C, 12C, projecting laterally along an edge of the side wall section 10B, 12B, respectively. Each wheel apron 14, 16 is integrally formed with a second mounting flange 14D, 16D projecting laterally outwardly along an edge thereof away from the suspension tower 6, respectively. The flanges 10C and 14D are located in the front body section with a certain distance in the lengthwise direction of the car body left therebetween. Similarly, flanges 12C and 16D have a certain distance provided therebetween. A bracket 24, formed as a U-channel, is provided for pivotally receiving the end of a suspension arm 28 and is welded or otherwise secured to, and thereby supported between, the flanges 10C and 14D and the apron panel section 14B of the wheel apron 14. Bracket 26, also formed as a U-channel, is provided for pivotally receiving the end of a suspension arm 30 and is welded or otherwise secured to, and thereby supported between, the flanges 12C and 16D and the apron panel section 16B of the wheel apron 16. The brackets 24 and 26 respectively support connecting pins 32 and 34. The ends of upper suspension arms 28 and 30 (partly shown in FIG. 3) are respectively coupled, through rubber bushes 32A and 34A, respectively, to brackets 24 and 26.

Because they are located at and secured to the front and rear ends of the suspension tower 6 and because they are constituted by the front and rear junction members 10 and 12 and the front and rear wheel aprons 14 and 16, the box-shaped channel frames 18 and 20 improve the structural rigidity of the suspension tower 6. Furthermore, because the front and rear junction members 10 and 12 and the front and rear wheel aprons 14 and 16, forming the box-shaped channel frames 18 and 20, enclose or grasp the brackets 24 and 26 for the suspension arms 28 and 30, respectively, an improved simple and strong suspension arm holding structure is provided. Additionally, the suspension tower and suspension arm holding structure is provided with increased structural rigidity by the same the box-shaped channel frames 18 and 20 rather than by separately provided reinforcing structures or members. This decreases the number of parts used to reinforce these structures, thereby reducing the cost and weight of the car body.

It is to be understood that whereas the invention has been described in detail with reference to a preferred embodiment, nevertheless, other embodiments and variants are possible which are within the spirit and scope of the invention, and such embodiments and variants are intended to be covered by the following claims.

What is claimed is:

1. A front body structure of a vehicle including a side frame and a front wheel reinforcement, both extending in a lengthwise direction from front to back of the vehicle, a front wheel housing connected between the side frame and front wheel reinforcement for receiving therein a front wheel, and a suspension tower for supporting a suspension, said front body structure comprising:

wheel aprons secured to and located on opposite sides of, in said lengthwise direction, said suspension tower, said wheel aprons extending in said lengthwise direction and forming said front wheel housing;

a junction member secured between said suspension tower and each wheel apron to form hollow channel frames adjacent to said suspension tower;

a pair of holding means, each divided into a pair of parts, one of said parts integrally formed with one of said wheel aprons and the other of said parts integrally formed with one of the junction members; and a bracket for a front suspension arm rigidly held between each pair of parts.

2. A front body structure as defined in claim 1, wherein said hollow channel frames each have a substantially rectangular cross-section.

3. A front body structure as defined in claim 2, wherein each junction member has a generally L-shaped cross-section and is located between said suspension tower and one of said wheel aprons, one wall of each junction member secured to said suspension tower and another wall of each junction member secured to one of said wheel aprons.

4. A front body structure as defined in claim 3, wherein said holding means comprises a first flange integrally formed with the other wall of each junction member and a second flange integrally formed with each wheel apron.

* * * * *